United States Patent Office 3,350,363
Patented Oct. 31, 1967

3,350,363
N - (ACYLAMIDOALKYL) - N' - VINYL - N,N'-ALKYLENEUREAS, POLYMERS THEREOF AND METHODS OF MAKING THEM
Melvin D. Hurwitz, Southampton, Pa., assignor to Rohm & Haas Company, Philadelphia, Pa., a corporation of Delaware
No Drawing. Filed Mar. 15, 1967, Ser. No. 623,198
16 Claims. (Cl. 260—77.5)

ABSTRACT OF THE DISCLOSURE

The monomers of the present invention are those of the formula

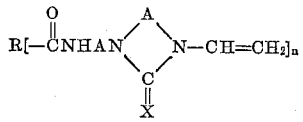

(I)

wherein:
$n$ is an integer having a value of 1 to 2,
X is oxygen or sulphur,
A is an alkylene group having 2 to 3 carbon atoms,
R is an alkylene group having 1 to 8 carbon atoms or it may be omitted when $n$ is 2, but when $n$ is 1, R may be H or a ($C_1$–$C_{24}$) hydrocarbon group. Homopolymers and copolymers are useful as or in impregnants and coating compositions of both aqueous and non-aqueous types.

---

This application is a continuation-in-part of copending application Serial No. 395,300, filed September 9, 1964 and now abandoned.

This invention is concerned with N-(acylamidoalkyl)-N' - vinyl - N,N' - alkyleneureas, polymers thereof and methods of making them.

More particularly, the invention is concerned with monomers of formula I hereinabove wherein A may be ethylene (—$CH_2CH_2$—), propylene (—$CH(CH_3)CH_2$—)

or trimethylene (—$CH_2CH_2CH_2$—) and R is an alkylene group having 1 to 8 carbon atoms or it may be omitted when $n$ is 2, and H ($C_1$–$C_{18}$)-aliphatic hydrocarbons, ($C_5$–$C_{18}$) alicyclic hydrocarbons, and ($C_6$–$C_{24}$) hydrocarbons having a monocyclic aromatic nucleus when $n$ is 1. Preferred compounds are those in which $n$ is 1 and R is selected from the group consisting of H and ($C_1$–$C_4$)-alkyl. When oxalic acid is used to prepare the compounds of Formula I from an amine of Formula II hereinafter, R disappears and the two units in the brackets are covalently bonded to each other at their amide linkages.

The compounds of this invention are useful as chemical intermediates. They react, for example, to form addition polymers and copolymers which are useful in coating compositions and textile finishing compositions, as adhesives, as paper treating agents, and as additives for viscose dopes and cellulose acetate dopes to improve the properties of fibers and films formed therefrom.

Various methods of preparation may be used to form the monomers. They are generally most advantageously prepared by reacting an organic acid, anhydride, ester, or acyl halide, such as the chloride or bromide, with an N-aminoalkyl-N'-vinyl-N,N'-alkylene-urea or -thiourea of the formula

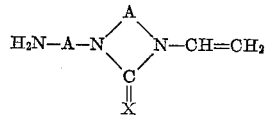

(II)

where A and X have the meanings stated above. Typical amine-containing compounds of the latter type are 1-(2-aminoethyl)-3-vinyl-2-imidazolidone,
1-(2-aminoethyl)-3-vinyl-2-thioimidazolidinone,
1-(2-aminopropyl)-4(or 5)-methyl-3-vinyl-2-imidazolidone,
1-(3-aminopropyl)-3-vinyl-hexahydro-2-pyrimidinone,
1-(3-aminopropyl)-3-vinyl-hexahydro-2-thiopyrimidinone, etc.

Examples of monobasic carboxylic acids that may be used include formic, acetic, propionic, butyric, isobutyric, crotonic, 4-pentenoic, acrylic, methacrylic, hexoic, stearic, benzoic, 3-butenoic, p-methylbenzoic, and β-phenyl-acetic. Examples of dicarboxylic acids include oxalic, malonic, succinic, maleic, fumaric, itaconic, adipic, and sebacic. Any anhydride of these monocarboxylic and dicarboxylic acids may be used.

In many instances, the preferred way of preparing the new monomers is by reacting an ester of any of these acids, either monobasic or dibasic, with the amine. The methyl, ethyl, or any higher alcohol ester may be used but generally the methyl is preferred.

The halide or dihalide, such as the bromide or chloride, or the dibromide or dichloride, of any of the acids mentioned may also be used.

The reaction in any case is carried out in bulk or in an inert solvent for the reactants. When one of the reactants is capable of serving as a solvent medium, an excess of this reactant over the normal stoichiometric equivalent amount is used for this purpose. The esters are of this nature. When another solvent is needed or desired, any suitable inert solvent, such as chloroform, carbon tetrachloride, methylenedichloride, xylene, or the like may be used.

In general the reaction may be carried out at room temperature or lower down to 10° C. or at elevated temperatures up to the reflux temperature of solvent used. The time required depends on the temperature, the size of batch, and other factors; thus at room temperatures, an overnight or longer period may be needed whereas at 80° C. an hour or two may suffice.

The amine and the other reactant are generally used in approximately stoichiometric equivalent amounts, though more or less of either reactant may be used; for example an excess of ester may be used to provide a solvent medium for the reaction; when an acyl halide is used, an excess of the amine may be used to serve as the hydrogen halide acceptor.

When an acid is used, water may be removed by distillation to recover the product remaining. When an anhydride is used, an alkali may be added to neutralize excess acid remaining, which can then be separated by decantation or filtration. When an ester is one of the reactants, the alcohol liberated is distilled from the product, preferably under vacuum. When an acid halide is used, an organic or inorganic base is used to accept hydrogen halide developed by the reaction, and the resulting salt is removed by decantation or filtration.

In general, the products are isolated in the form of oils at room temperature, but some of them form soft amorphous or crystalline solids at room temperature or if chilled to 0° C. When solids are obtained, they can be purified by crystallization.

The compounds of Formula I are either high-boiling liquids or solid crystalline materials generally white or colorless when pure, and they are generally soluble in alcohols, especially methanol, ethanol, and isopropanol, in dimethylformamide, ethyl acetate, acetonitrile, dimethylacetamide, and acetone. Some of the compounds of low molecular weight are water-soluble.

Compounds of Formula I are useful as plasticizers, particularly with nylons of the polyamide type including that known as 66 nylon, and also for vinyl resins, such as copolymers of vinyl chloride with vinyl acetate. The compounds of Formula I may be introduced into all sorts of formed structures, such as fibers, films, sheets, rods and other shaped structures, formed of various vinyl resins, such as copolymers of vinyl chloride with acrylonitrile or vinyl acetate, homopolymers of vinyl chloride, vinylidene chloride, or acrylonitrile, copolymers of vinylidene chloride with acrylonitrile or vinyl acetate or vinyl chloride, copolymers of acrylonitrile with vinyl acetate, vinyl pyridines, ethylene, isobutylene, and so on, by introducing from 2% to 10% by weight, on the weight of the film-forming polymer, in the melt, solution, or dispersion of the latter before its extrusion, casting, or molding into the final shaped product. The incorporation of the compounds of Formula I in this manner into formed vinyl resin structures serves various purposes including modification of the dyeing, which is particularly important in the production of fibrous materials from polymers of acrylonitrile containing 75% to 95% of the acrylonitrile with other comonomers. Another important purpose served by the introduction of the new compounds into various formed articles made from vinyl resins and especially the polymers of acrylonitrile just mentioned is the increase in moisture retention or moisture regain of the structures and also the reduction of the tendency to develop static electricity during spinning operations as in carding, drawing and twisting, weaving and knitting, and so on. The compounds of Formula I may also be included with glycerine, or glycols to provide softening compositions for products, and especially pellicles, films, or sheets formed of regenerated cellulose and hydroxyethyl cellulose to enhance the slip characteristics of the sheets and to reduce blocking tendencies thereof.

The compounds of Formula I are also useful as modifiers in aminoplast resin-forming condensates generally, especially those of urea-formaldehyde and melamine-formaldehyde. In such case, a small amount of a free radical initiator of the types described hereinafter may be included to provide addition polymerization before, during, or after the thermosetting condensation reaction. In this connection, the new compounds may take part in the thermosetting reaction by virtue of the reactivity of the hydrogen on the nitrogen with formaldehyde or with formaldehyde in conjunction with a lower alcohol from methyl through butyl that may be present in the aminoplast composition.

As a chemical intermediate, the compounds of the present invention are adapted to react at the double bond (when present in R) with various compounds including alcohols, mercaptans, primary or secondary amines, nitroalkanes, malonates, acetoacetates, sodium bisulfite, and so on. The addition of long chain amines or mercaptans such as dodecylamine or mercaptan, provides compounds, which are highly useful as waterproofing, softening, and lubricating agents for textiles of all types and especially of cellulosic type including rayon and cotton, for leather and for paper.

The compounds of Formula I may be polymerized or copolymerized in bulk, in solution, or in either an emulsion or suspension technique to produce various types of polymers including the granular type. Solution polymerization may be effected in such solvents as water, dimethylformamide or other of the solvents mentioned above in which the compounds of Formula I and any comonomers that may be used are suitably soluble. Although the compounds of Formula I have generally an appreciable solubility in water, these compounds may be copolymerized with water-insoluble monomers by an emulsion technique in which the comonomers and any excess of the compound of Formula I over the amount that is soluble in the water are emulsified by nonionic, cationic, or anionic emulsifiers or suitable mixtures thereof.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl of dibutyl azodiisobutyrate, azobis($\alpha,\gamma$ - methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable nonionic emulsifiers include the higher alkyl phenoxypolyethoxyethanols in which the alkyl group has from 6 to 18 carbon atoms, such as octyl, dodecyl, or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

Examples of vinylidene or monoethylenically unsaturated compounds having a terminal $H_2C{=}C{<}$ group that may be copolymerized with the compound of Formula I include vinyl esters, especially vinyl acetate, propionate, butyrate, laurate, oleate, and stearate, 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene vinyl toluene, vinylcarbazole, and allyl esters of monocarboxylic acids. Specific additional vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate, or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, α-methylstyrene, p-methylstyrene, p-chlorostyrene, vinylnaphthalene, etc. When two or more free radical polymerizable vinylidene groups occur, as in divinylbenzene, trivinylbenzene, ethylene diacrylate or methacrylate, bis (vinyloxyethyl)urea, or vinyloxyethyl acrylate or methacrylate, insoluble interpolymers result.

Especially useful copolymers include those containing at least 10% by weight of vinyl acetate and about ½ to 10% by weight of a monomer of Formula I. Preferred polymers in this group are those containing at least 50% of vinyl acetate, and 1 to 5% of a monomer of Formula I, any balance of the polymer being formed of at least one monomer of monoethylenically unsaturated type having a terminal $H_2C=C<$ such as an ester of 4-pentenoic acid, crotonic acid, acrylic acid or methacrylic acid, styrene, vinyltoluene, acrylonitrile or acrylamide.

The water-soluble homopolymers of compounds of Formula I (e.g. those having R=H or methyl) are generally useful as sizes for paper, textiles and particularly as warp sizes. When introduced into paper pulps, they provide increased wet strength in the final dry paper containing them. For this purpose, there may be used from about 1% to 7% of a polymer of one of the compounds of Formula I on the dry fiber weight of the paper. They are useful as thickeners for various aqueous coating, adhesive, and film-forming compositions. These homopolymers are also useful as flocculants, especially useful in higher molecular weights of at least 20,000 to 50,000 to aid in the clarification of aqueous systems containing clays, or other finely divided materials, especially mineral matter as is produced in the grinding of ores. In this connection, they not only increase the settling rate but generally increase the rate of filtration. The homopolymers may be used in admixture with other materials, such as starch, gelatin, or plasticizers therefore to provide coatings or films, thickening materials, warp sizes or the like. The homopolymers mixed with other film-forming materials, such as vinyl and acrylic resins, may be pigmented or dyed to provide decorative coatings on substrates, such as textile, leather, paper, wood or on metal or glass surfaces.

Copolymers containing a large proportion of one or more of the compounds of Formula I have similar utilities to the extent that they are water-soluble as warp sizes, wet strength resins in paper, thickeners, and flocculants. However, copolymers containing from 0.5% to 20% by weight or more of any of the compounds of Formula I with various comonomers are adapted to provide valuable coating materials in organic solvent type lacquers or enamels which may be pigmented or not and, in the case of emulsion copolymers, they are adapted to provide valuable water-base paints. Copolymers containing from 3% to 20% by weight of a compound of Formula I with ethyl acrylate, butyl acrylate, or the like, are useful to reduce the shrinkage of wool or for the bonding of fibers in "nonwoven" fabrics. For these purposes they may be applied in aqueous dispersions of a concentration from 10% to 50% so that from about 5% to 15% by weight of the copolymer is deposited on the wool fabric, or as much as 40% to 200% on the weight of fiber in nonwoven fabric. After drying, the treated fabric may be heated to 240° F. to 350° F. from a period of one-half to fifteen minutes. Similar aqueous dispersions made by the emulsion copolymerization of a monomer of Formula I with acrylic esters and especially butyl acrylate or ethyl acrylate are useful, with or without pigment, for the primary coating of leather. Copolymers with acrylonitrile, especially those containing from 75% to 90% of acrylonitrile, with a compound of Formula I provide useful fiber- and film-forming materials which are adapted to be spun or cast to form fibers and films which are characterized by improved receptivity toward dyes. Copolymers of a compound of Formula I with acrylic acid or methacrylic acid or copolymers thereof with a vinylpyridine, when included in melts or solutions of polymers of acrylonitrile containing 75% to 90% acrylonitrile, such as copolymers thereof with vinyl chloride, vinyl acetate or the like, serve to modify the dyeing properties of fibers and films formed therefrom.

The presence of a monomer of Formula I in water-insoluble copolymers containing from 0.5 to 10% by weight of such monomer in polymerized form has been found to enhance the adhesion of the coatings deposited either from organic solvent solutions or dispersions or aqueous dispersions of the copolymers to many substrates, such as paper, textiles, leather, wood, bare metals, such as steel, aluminum, and copper, and metals primed with commercially available alkyd, aminoplast, or epoxy-containing primers. The monomers in which X is oxygen, $n$ is 1, and R is H or methyl are especially valuable in this connection.

To assist those skilled in the art to practice the present invention, the following modes of operation are suggested by way of illustration, parts and percentages being by weight unless otherwise specifically noted.

EXAMPLE 1

*Preparation of N-(β-formamidoethyl)-N'-vinyl-N,N'-ethyleneurea*

N-(β-aminoethyl)-N'-vinyl-N,N'-ethyleneurea (I), 155 g. (1.0 mole) is mixed with 120 g. (2.0 mole) methyl formate (II) and allowed to stand at ambient room temperature for a week. At the end of this time excess methyl formate and methanol (IV) resulting from the following aminolysis reaction

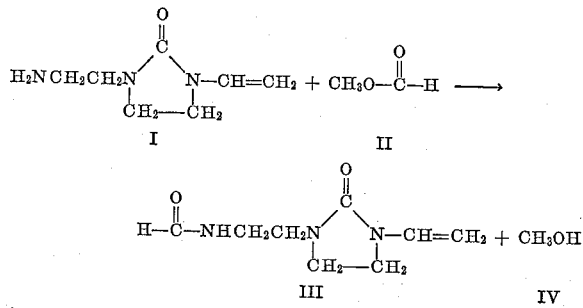

are removed at room temperature under vacuum to a final pressure of less than 1 mm. (Hg).

The viscous water-soluble oil remaining (III) (179 g. or about 98% crude yield) is analyzed for residual amino groups by direct aqueous titration; less than 5% of the original amino groups remain. The infrared spectrum is consistent with the structure as illustrated (III).

Percent N found 27.2. Percent N calculated 27.1.

EXAMPLE 2

*Preparation of N-(β-benzamidoethyl)-N'-vinyl-N,N'-ethyleneurea*

To a mixture of 15.5 g. (0.1 mole) of N-(β-aminoethyl)-N'-vinyl-N,N'-ethyleneurea and 20 ml. saturated potassium carbonate solution is added slowly with agitation and with cooling 14.0 g. (0.1 mole) benzoyl chloride. After an hour of agitation, on completion of addition, sufficient water is added to dissolve the inorganic salts, and the product, N-(β-benzamidoethyl)-N'-vinyl-N,N'-ethyleneurea, is filtered off and dried under vacuum. Yield is 16.3 g. or 63%. Recrystallization from ethanol yielded a purer material having a melting point of 75–77° C.

Percent N found 16.0. Percent N calculated 16.2.

EXAMPLE 3

*Preparation of N-(3-acetamidopropyl)-N'-vinyl-N,N'-trimethyleneurea*

N-(3-aminopropyl)-N'- vinyl - N,N' - trimethyleneurea (169 g.) is mixed with 150 g. methyl acetate and the mixture is held in an oven having an inside temperature of 32° C. for a period of about eight days. Excess methyl acetate and methanol are removed by distilling under vacuum as in Example 1 above, leaving the product N-(3-acetaamidopropyl)-N'-vinyl-N,N'-trimethyleneurea as the residue.

EXAMPLE 4

N-(β-butyramidopropyl)-N'-vinyl - N,N'-propyleneurea may be made by the procedure of Example 1 above using as the starting materials N-(2-aminopropyl)-N'-vinyl-N,N'-propyleneurea and methyl butyrate, the mixture thereof being allowed to stand at room temperature (25° C.) for three weeks.

EXAMPLE 5

By allowing a mixture of 2 moles of 1-(3-aminopropyl)-3-vinyl-hexahydro-2-thiopyrimidinone and 1 mole of dimethyl adipate dissolved in dimethylformamide to stand at 40° C. for two weeks, there can be obtained a solution of

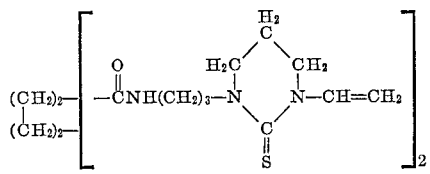

This diethylenically unsaturated compound may be copolymerized with methacrylic acid in weight proportions of ½ part of the former compound to 99.5 parts of the latter to produce a high molecular weight thickening material to serve in both aqueous and organic solvent systems, such as to thicken water-base paints or organic solvent lacquers.

EXAMPLE 6

(a) A mixture of 273 g. of methyl methacrylate, 166.5 g. of butyl methacrylate, 25.4 g. N-(β-formamidoethyl)-N'-vinyl-N,N'-ethyleneurea and 500 g. of ethoxyethyl acetate is heated in a glass vessel provided with a nitrogen atmosphere to 70 to 75° C. Then 4 g. of azodiisobutyronitrile is added while agitating. After the third and fifth hours respectively at 75 to 80° C., solutions of 2 g. of azodiisobutyronitrile in 50 g. of ethoxyethyl acetate are added. Three hours later the reaction mixture is filtered, giving a solution of the copolymer having a Gardner-Holdt viscosity of Z–5 at 41.8% solids.

Clear, pigmented and/or plasticized coatings made from this copolymer solution exhibit excellent adhesion when applied to alkyd-primed surfaces. Coatings made of a similar copolymer but not incorporating the N-(β-formamidoethyl)-N'-vinyl-N,N'-ethyleneurea exhibit comparatively poor adhesion.

(b) Procedure (a) is repeated except that 50 g. of N-(β-benzamidoethyl)-N'-vinyl-N,N'-ethyleneurea is substituted for the N-(β-formamidoethyl)-N'-vinyl-N,N'-ethyleneurea. The solution copolymer has a Gardner-Holdt viscosity of about Z–9 at 43.1% solids.

(c) The procedure of part (a) hereof is repeated using 40.5 g. of N-(β-butyramidopropyl)-N'-vinyl-N,N'-propylene urea. Clear, pigmented and/or plasticized coatings made from this copolymer solution exhibit excellent adhesion when applied to alkyd-primed surfaces.

(d) The procedure of part (a) hereof is repeated using 65 g. of N-(3-acetamidopropyl)-N'-vinyl-N,N'-trimethyleneurea. When the solution is sprayed at 20% solids on cold-rolled steel primed with an alkyd-epoxy primer of commercial type and then dried and cured at 150° C. for a ten-minute period, the coating shows good adhesion thereto.

EXAMPLE 7

(a) To a one-liter glass flask equipped with a 4-bladed, propellor-type agitator, there are added the following ingredients, with the agitator rotating at approximately 470 r.p.m.:

376 ml. deionized water
24 g. sodium octylphenoxydiethoxyethyl sulfate
97.5 g. methyl methacrylate, inhibitor free
5.0 g. N-(β-formamidoethyl)-N'-vinyl-N,N'-ethyleneurea
4 ml. solution of 0.3 g. ferrous sulfate (FeSO$_4$·7H$_2$O) in 200 ml. of water, representing 6 p.p.m. of iron in the emulsion
1 g. ammonium persulfate The temperature is adjusted to 20° C., and 1 g. of sodium metabisulfite and 5 drops of 5-butyl hydroperoxide (70%) are added. No induction period occurs, and the temperature rises to 89° C. within 2–3 minutes. Most of the reaction occurs within a few minutes and is essentially complete 15 minutes after the start of the reaction.

(b) The same procedure is used as in part (a) except the monomer charge is as follows:

120 g. vinyl acetate
60 g. ethyl acrylate
20 g. N-(β-formamidoethyl)-N'-vinyl-N,N'-ethyleneurea

| | Part (a) | Part (b) |
|---|---|---|
| pH at 26° C | [1] 2.6 | 2.6 |
| Viscosity, cps | 7.8 | 10.1 |
| Minimum Film-Forming Temperature ° C. (Mft) | [1] 90 | 12.0 |
| Solids (found), percent | 33.6 | 33.1 |
| Solids (theoretical), percent | 34.3 | 34.3 |

[1] About.

(c) Wood panels of white pine are coated with the 33% solids emulsion copolymer dispersion of part (b) by brushing the dispersion on the panels.

(d) Other panels of white pine have brushed on their surfaces a pigmented primer formed of the copolymer dispersion of part (b) and having the following formulation:

| | Parts |
|---|---|
| Ammonium salt of maleic anhydride/diisobutylene copolymer | 0.4 |
| Rutile titanium dioxide | 28.3 |
| Water ground mica | 71.7 |
| Hydroxyethyl cellulose (4%) | 71.7 |
| Ethylene glycol | 1.4 |
| Copolymer dispersion of part (b) (33% solids) | 723.0 |
| Preservative | 4.3 |
| Antifoamer | 2.8 |

(e) The dried primed panels obtained in parts (c) and (d) are then coated with two coats of a water-base acrylic polymer exterior paint. The same water-base acrylic emulsion exterior paint is applied in two coats over unprimed white pine panels. After drying in air, the coated boards on testing in a laboratory blister box show improved adhesion is obtained over the panels primed with the clear or pigmented primer applied as in parts (c) and (d).

EXAMPLE 8

Procedure 7 (b) is repeated except that N-(3-aminopropyl)-N'-vinyl-N,N'-trimethyleneurea is substituted for the N-(β-formamidoethyl)-N'-vinyl-N,N'-ethyleneurea.

I claim:
1. A compound of the formula

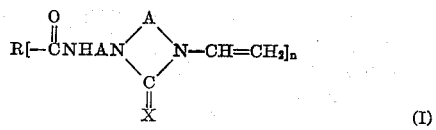

(I)

wherein:
n is an integer having a value of 1 to 2,
X is a chalcogen having an atomic weight from 16 to 32,
A is an alkylene group having 2 to 3 carbon atoms,
R is selected from the group consisting of a mere connecting bond and alkylene groups having 1 to 8 carbon atoms when n is 2, and H, ($C_1$–$C_{18}$)-aliphatic hydrocarbons, ($C_5$–$C_{18}$) alicyclic hydrocarbons, and ($C_6$–$C_{24}$) hydrocarbons having a monocyclic aromatic nucleus when n is 1.

2. As a composition of matter, an addition polymer of a compound of claim 1.
3. As a composition of matter, an addition copolymer of ethylenically unsaturated monomers comprising a compound of claim 1.
4. As a composition of matter, an addition copolymer of at least about 0.5% by weight of a compound of claim 1 and up to 99.5% by weight of at least one other copolymerizable monoethylenically unsaturated monomer.
5. A compound of the formula

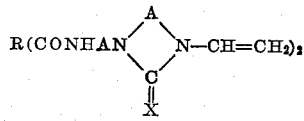

wherein:
A is an alkylene group having 2 to 3 carbon atoms,
X is a chalcogen having an atomic weight of 16 to 32, and
R is a ($C_1$–$C_8$)-alkylene group.

6. As a composition of matter, an addition polymer of a compound of claim 5.
7. As a composition of matter, an addition copolymer of ethylenically unsaturated monomers comprising a compound of claim 5.
8. As a composition of matter, an addition copolymer of ethylenically unsaturated molecules comprising at least about 0.5% by weight of a compound of claim 5.
9. A compound of the formula

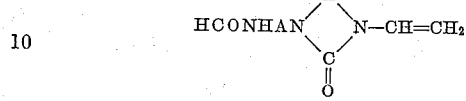

wherein A is an alkylene group having 2 to 3 carbon atoms.

10. As a composition of matter, an addition polymer of a compound of claim 9.
11. As a composition of matter, an addition copolymer of ethylenically unsaturated monomers comprising a compound of claim 9.
12. As a composition of matter, an addition copolymer of ethylenically unsaturated molecules comprising at least about 0.5% by weight of a compound of claim 9.
13. N - (β - formamidoethyl)-N'-vinyl-N,N'-ethyleneurea.
14. As a composition of matter, an addition polymer of a compound of claim 13.
15. As a composition of matter, an addition copolymer of ethylenically unsaturated monomers comprising a compound of claim 13.
16. As a composition of matter, an addition copolymer of at least about 0.5% by weight of a compound of claim 13 and up to 99.5% by weight of at least one other copolymerizable monoethylenically unsaturated monomer.

References Cited
UNITED STATES PATENTS

| | | | |
|---|---|---|---|
| 2,727,016 | 12/1955 | Hankins et al. | 260—77.5 |
| 2,840,545 | 6/1958 | Yost | 260—77.5 |
| 3,136,736 | 6/1964 | Washburne et al. | 260—77.5 |

DONALD E. CZAJA, *Primary Examiner.*

LEON J. BERCOVITZ, *Examiner.*

G. W. RAUCHFUSS, Jr., *Assistant Examiner.*